United States Patent [19]

Instance

[11] Patent Number: 4,711,686

[45] Date of Patent: Dec. 8, 1987

[54] METHOD OF MAKING LABELS

[76] Inventor: David J. Instance, Guinea Hall, Sellindge, Kent, United Kingdom

[21] Appl. No.: 829,909

[22] Filed: Feb. 18, 1986

[30] Foreign Application Priority Data

Feb. 18, 1985 [GB] United Kingdom ................. 8504114

[51] Int. Cl.[4] ............................................. B32B 31/18

[52] U.S. Cl. ..................................... 156/227; 40/306; 229/69; 229/70; 281/2; 282/11.5 A; 282/16 C; 282/25; 283/81; 283/100; 283/101; 283/103; 283/105; 283/106; 156/253; 156/268; 156/270

[58] Field of Search ............... 156/227, 253, 268, 270, 156/297, 298, 303, 303.1, 306.3, 529, 552; 281/2; 282/11.5 A, 16 C, 25; 283/81, 100, 101, 103, 105, 106; 229/69, 70; 40/306, 310, 312

[56] References Cited

U.S. PATENT DOCUMENTS

| | | | |
|---|---|---|---|
| 3,337,120 | 8/1967 | Steidinger | 229/69 |
| 3,355,090 | 11/1967 | Werby | 229/69 |
| 3,524,782 | 8/1970 | Buske | 156/253 |
| 4,171,048 | 10/1979 | Ernst | 229/69 |
| 4,311,325 | 1/1982 | Steidinger | 282/11.5 A |
| 4,323,608 | 4/1982 | Denny et al. | 283/81 |
| 4,359,358 | 11/1982 | Hattemer | 156/268 |
| 4,529,229 | 7/1985 | Glibbeny | 283/81 |
| 4,534,582 | 8/1985 | Howard | 40/306 |
| 4,592,572 | 6/1986 | Instance | 283/81 |

*Primary Examiner*—Caleb Weston

*Attorney, Agent, or Firm*—Birch, Stewart, Kolasch and Birch

[57] ABSTRACT

A label to be affixed to a container is disclosed. The label includes a longitudinal strip divided into two or more panels by one or more transverse fold lines. An end panel of the strip forms a front cover for the remaining panel or panels when the remaining panel or panels is or are folded behind the front cover panel. The front cover panel has a folded edge defined by the fold line between the front cover panel and the adjacent panel and a free outer edge which is opposite the folded edge and extends beyond the remaining panel or panels of the strip when folded. The extending part of the front cover panel has one or more holes, a support web for the longitudinal strip and a layer of pressure sensitive self-adhesive material which is adhered by the self-adhesive surface thereof over the front cover panel. The self-adhesive material extends beyond the folded edge thereby to adhere the front cover panel to the support web and covers the hole or holes in the front cover panel thereby to form one or more exposed portions of the self-adhesive material. Each exposed portion is in registry with a respective hole and can be adhered to the support web to secure the front cover panel in a folded condition over the remaining panel or panels and can be pulled away from the support web to unfold the front cover panel and give access to the remaining panel or panels. The invention also provides a method for producing these labels on a length of release backing material.

14 Claims, 8 Drawing Figures

METHOD OF MAKING LABELS

BACKGROUND OF THE INVENTION

The present invention relates to labels to be affixed to a container and to a method of producing a succession of these labels on a length of release backing material.

The labels of the present invention have particular application in the labelling of containers such as boxes, packets, tins, jars, bottles, etc. It is frequently desirable when labelling such containers to have a label which is a so-called "extended text" label. This type of label provides additional surface area for information relating to the product in the container.

SUMMARY OF THE INVENTION

The present invention aims to provide this type of label and also a simple and inexpensive method for producing them.

Accordingly, the present invention provides a label for being affixed to a container comprising a longitudinal strip divided into two or more panels by one or more transverse fold lines. An end panel of the strip forms a front cover for the remaining panel or panels when the remaining panel or panels is or are folded behind the front cover panel. The front cover panel has a folded edge defined by the fold line between the front cover panel and the adjacent panel and a free outer edge which is opposite the folded edge and extends beyond the remaining panel or panels of the strip when folded. The extending part of the front cover panel has one or more holes, a support web for the longitudinal strip and a layer of pressure sensitive self-adhesive material which is adhered by the self-adhesive surface thereof over the front cover panel. The self-adhesive material extends beyond the folded edge thereby to adhere the front cover panel to the support web and covering the hole or holes in the front cover panel thereby to form one or more exposed portions of the self-adhesive material each of which is in registry with a respective hole and can be adhered to the support web to secure the front cover panel in a folded condition over the remaining panel or panels and can be pulled away from the support web to unfold the front cover panel and give access to the remaining panel or panels.

The present invention further provides a method of producing a succession of self-adhesive labels on a length of release backing material, the method comprising the steps of:

(a) applying a succession of folded labels to the adhesive surface of a first web of a pressure-sensitive self-adhesive material, each folded label comprising a longitudinal strip divided into two or more panels by one or more transverse fold lines, an end panel of the strip forming a front cover for the remaining panel or panels when the remaining panel or panels are folded behind the front cover panel, the front cover panel having a folded edge defined by the fold line between the front cover panel and the adjacent panel and a free outer edge which is opposite the folded edge and extends beyond the remaining panel or panels of the strip when folded, the extending part of the front cover panel having one or more holes, the front cover panel of each folded label being adhered to the first web so that the hole or holes in the front cover panel are covered by the self-adhesive material thereby to form one or more exposed portions of the self-adhesive material;

(b) applying over the succession of folded labels and the adhesive surface of the first web a second web comprising a self-adhesive support web having a release backing material, the front surface of the support web being adhered to the regions of the first web which surround the folded labels and to the exposed portions of the self adhesive material;

(c) cutting through the layers of the webs other than the release backing material so as to form a succession of self-adhesive labels on the release backing material; and (d) cutting, either before, after or simultaneously with cutting step (c), a succession of elongate cuts or weakened tear lines through the first web so that in each resultant label, the cut or weakened rear line is in registry with the free outer edge of the front cover panel whereby the front cover panel in the resultant label is secured in a folded condition by the exposed portions of the self-adhesive material which are adhered to the support web and the exposed portions of the self-adhesive material can be pulled away from the support web to unfold the front cover panel and give access to the remaining panel or panels.

The present invention still further provides a method of producing a succession of self-adhesive labels carried on a backing of release material, the method comprising the steps of:

(a) applying a succession of labels to the adhesive surface of a first web of a pressure-sensitive self-adhesive material, each applied label being a folded sheet and envelope, a multiple-ply label or an envelope containing an article;

(b) applying over the succession of applied labels and the adhesive surface a second web comprising a self-adhesive support web having a backing of release material, the support web being adhered to the regions of adhesive surface of the first web which are not covered by the applied labels;

(c) cutting through the layers of the webs other than the backing of release material so as to cut a succession of self-adhesive labels on the backing of release material; and (d) cutting, either before, after or simultaneously with cutting step (c), a succession of elongate cuts or weakened tear lines through the first web so that in each resultant self adhesive label the cut or weakened tear line extends around a portion of the edge of the applied level whereby separation of the first web along the cut or weakened tear line permits access to the interior of the applied label. The backing carrying the resultant labels can then be wound into a reel to form a supply roll, or can be folded to form a fan-folded supply of labels.

Preferably, the folded sheets and envelopes applied to the first web are those described in British Patent No. 1475304 and consist of a sheet (e.g. a sheet of printed instructions) and an envelope therefor, both formed from a single folded sheet, e.g. of paper, wherein the single sheet is divided into at least two parallel rows of three rectilinear panels each. The two outer panels of a first row are separated from the corresponding two outer panels of the next row by cuts and the middle panels of the first and next rows are joined to one another through a line of perforations aligned with the cuts. The single sheet is so folded that the panels of the first row form the envelope and the sheet, e.g. of instructions, is composed of the panels of the next row and of any further rows which are folded to lie adjacent one face of the middle panel of the first row, whereby the sheet is enclosed in the envelope but can be removed and detached therefrom by tearing along the line of perforations. They can also be those described in British Patent Specification No. 2115744 and consist of a sheet (e.g. a sheet of printed instructions) and an envelope therefor, both formed from a single folded sheet, e.g of paper, wherein the single sheet is divided into at least two parallel rows of three rectilinear panels each. The panels of the first row are separated from the corresponding panels of the next row by a line of perforations and each of the two outer panels of the first row of panels has a portion cut away inwardly from the respective outer edge of the sheet adjacent the line of perforations so that the line of perforations stops short of the outer edges of the sheet. The single sheet is so folded that the panels of the first row form the envelope, and the sheet is composed of the panels of the next row and of any further rows which are folded to lie adjacent one face of the corresponding panel of the first row, whereby the sheet is enclosed in the envelope but can be removed and detached therefrom by tearing along the line of perforations. The front surface of the middle panel of the envelope is adhered to the first web and the cut or weakened tear line extends along the unfolded edge of the middle panel of the envelope.

Examples of the multiple-ply labels suitable for application to the web are those described in British Patent Specification No. 2115775 and consist of a longitudinal strip divided into a series of panels by a plurality of transverse fold lines. The first two of the panels form a front cover and a back cover respectively for enveloping the remaining panel or panels of the strip when folded. The transverse fold lines are spaced along the strip so that upon folding of the strip the remaining panel or panels is or are folded to lie over the back cover and is or are in turn covered by folding of the front cover about the fold line between the front and back covers and wherein the front cover extends beyond the area occupied by the back cover. A band of adhesive is provided on the inner face of the free outer edge of the front cover panel adjacent to the outer edge for securing the outer edge of the front cover. The front cover of the folded label is adhered to the first web and in the resultant self-adhesive label the cut or weakened tear line is in registry with the free outer edge of the front cover panel.

In a preferred multiple-ply label, the front surface of the front cover is printed, for example, with textual information. Preferably the front surface is lithographically printed, the labels having been individually lithographically printed with a high quality printed image. Furthermore, such lithographically printed labels need not be provided with the remaining panel or panels of the labels of British Patent Specification No. 2115775.

Accordingly, in a further preferred embodiment the multiple-ply label is a longitudinal strip divided into two panels by a transverse fold line. The two panels form a front cover and a back cover respectively for the label when folded and the front surface of the front cover carries a lithographically printed image. The transverse fold line is spaced along the strip so that upon folding of the strip about the fold line between the front and back covers the front cover lies over the back cover and extends beyond the area occupied by the back cover, and a bank of adhesive is provided on the inner face of the free outer edge of the front cover panel adjacent to the outer edge for securing the outer edge of the front cover to the support web. The front cover of each folded label is adhered to the first web and in each resultant self-adhesive label the cut or weakened tear line is in registry with the free outer edge of the front cover panel.

In the multiple-ply labels, the band of adhesive may be a resealable adhesive.

When an envelope containing an article is adhered to the support web, the article contained in the envelope can be a printed sheet of instructions, a booklet or any other suitable flat article relating to the product with which the label is to be associated.

The envelope containing an article is formed from a single folded sheet. The sheet is divided into a row of three rectilinear panels, the middle panel having at one longitudinal edge thereof a lower panel and at the other longitudinal edge thereof an upper panel which is separated from the middle panel by a line of perforations. The envelope is formed by folding the two outer panels of the row and the lower panel over the rear face of the middle panel so that the envelope is closed either by disposing the rear face of the envelope against the support web or by folding the upper panel or a portion thereof over the rear face of the middle panel, whereby the envelope so closed can be opened by tearing along the line of perforations so that the article therein can be removed. The middle panel is adhered to the first web and in each resultant self-adhesive label the cut or weakened-tear line extends in registry with the line of perforations. Preferably, the envelope, as in a conventional envelope, is a sheet which consists of a central panel surrounded by four foldable panels which can be folded along respective fold lines to provide a continuous rear surface which is coextensive with the front surface of the central panel and consists of each of the four folded panels. A line of perforations can be provided along an edge of or in the front surface of the envelope so that when the envelope is attached to the support web by the first web the envelope can readily be opened and the article therein removed by tearing along the line of perforations.

Alternatively, the envelope can be a sheet which consists of a central panel surrounded by three foldable panels and one panel which is not folded. The three foldable panels are folded along respective fold lines to provide a continuous rear surface which is coextensive with the front surface of the envelope and consists of each of the three folded panels. The rear surface of the fourth, unfolded panel is adjacent the continuous rear surface and the rear surfaces may be disposed against the support web by the adhesion of the first web to the support web. A line of perforations joins the fourth, unfolded panel to the rest of the envelope. When the envelope is adhered to the support web, tearing along the line of perforations separates the adhered fourth panel from the envelope so that the envelope can be opened and the article therein removed.

If desired, the fourth panel may be omitted and then the cut or weakened tear line extends along the open edge of the envelope.

In each of the above-described forms of the envelope containing an article, the front surface of the envelope may be pre-printed with textual information.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
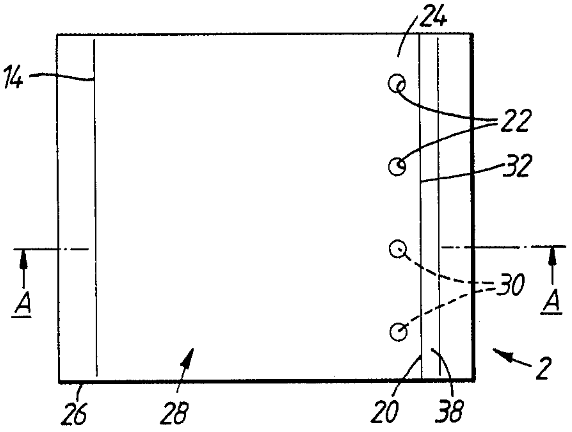
FIG. 1 is a plan view of a label in accordance with the present invention.
Figure 2:
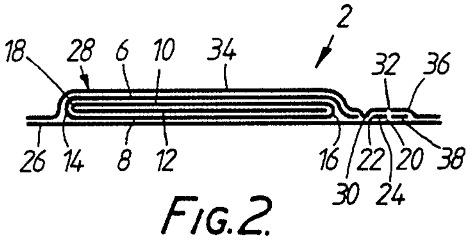
FIG. 2 is a cross-sectional view along A—A of the label of FIG. 1.
Figure 3:
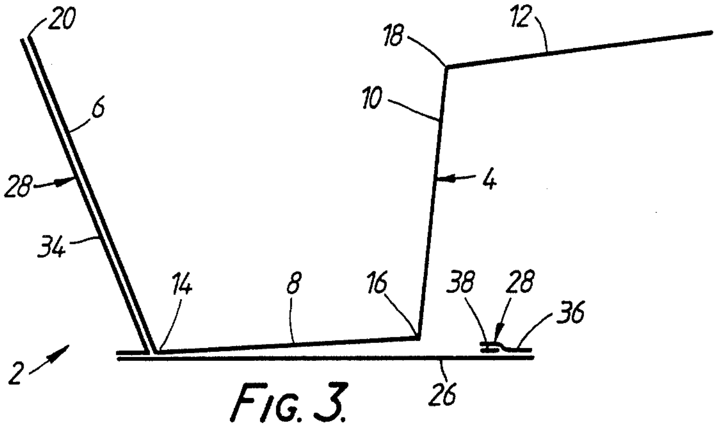
FIG. 3 is a side view of the label of FIG. 1 when opened.

Referring to FIGS. 1 to 3, a label 2 includes a longitudinal strip 4. The longitudinal strip 4 has a number of panels which are separated from each other by a plurality of transverse fold lines. In the arrangement shown, the longitudinal strip 4 consists of four panels 6, 8, 10, 12 divided by transverse fold lines 14, 16, 18. The first panel 6 forms a front cover for the label 2 and the second to fourth panels 8, 10, 12 are folded behind the front cover panel 6 as shown in FIGS. 1 and 2. Each of the panels 6, 8, 10, 12 may be printed as desired. The longitudinal strip 4 is preferably made of paper.

The first cover panel 6 is provided near its free outer edge 20 thereof (the free outer edge 20 being opposite the fold line 14 between the front cover panel 6 and the second panel 8) with a plurality of cut-out holes 22. The holes 22 are preferably circular and are formed in a line which is spaced from the free outer edge 20. The holes 22 can be produced by punching. The front cover panel 6 is made longer than each of the remaining panels 8, 10, 12 such that when the remaining panels 8, 10, 12 are folded behind the front cover panel 6 the free outer edge 20 extends beyond the edge of the remaining panels so as to form an overlapping portion 24. The holes 22 are formed in the overlapping portion 24.

The folded longitudinal strip 4 is mounted on a support web 26 which may be paper. Preferably, the support web 26 is coated on its rear surface with a pressure sensitive adhesive which renders the label 2 self-adhesive. The self-adhesive label 2 may be carried on a web of release backing material (not shown).

The folded longitudinal strip 4 is covered by a layer of plastic material 28 which is preferably transparent and is composed of, for example, a polyester. The layer of plastic material 28 is self-adhesive and is adhered by its self-adhesive surface to the front cover panel 6 and also to those areas of the support web 26 which are at opposing ends of the front cover panel 6 and are not covered by the front cover panel 6. The layer of plastic material 28 is adhered to the part of the support web 26 which is adjacent that edge of the folded longitudinal strip 4 which is formed by fold line 14. In this way the edge of the front cover panel 6 which is formed by fold line 14 is adhered to the support web 26. The layer of plastic material 28 covers the holes 22 so that each hole 22 exposes a respective rearwardly facing portion 30 of the self-adhesive surface of the layer of plastic material 28. Each portion 30 of the layer of plastic material 28 is adhered to the support web 26 which is underneath the overlapping portion 24 thereby to retain the longitudinal strip 4 in a closed condition, as is shown in FIG. 2.

A cut 32 extends through the layer of plastic material along the free outer edge 20 of the front cover panel 6. The cut 32 separates the layer of plastic material 28 into two parts, a first part 34 which is adhered to the longitudinal strip 4 and to that part of the support web 26 which is adjacent that edge of the folded longitudinal strip 4 which is formed by fold line 14, and a second part 36 which is adhered to the remainder of the support web 26 which is not covered by the folded longitudinal strip.

In order to open the folded label, the free outer edge 20 is pulled away from the support web 26 thereby to release the portions 30 of the layer of plastic material 28 which are adhered to the support web 26. The front cover panel 6 may then be opened by unfolding about fold line 14 which is adhered to the support web 26 by the layer of plastic material 28. The remaining panels 8, 10, 12 may then be seen by a user. It will be noted that both the front and rear surface of each panel 6, 8, 10, 12 can be seen by a user when the label 2 is opened.

After use, the label 2 can be re-folded and then the portions 30 of the layer of plastic material 28 can be re-adhered by their self-adhesive surface to the support web 26 and again retain the label 2 in a closed condition.

The label 2 may be opened and closed a number of times and the pressure-sensitive adhesive on the layer of plastic material 28 is such that the portions 30 thereof readily re-adhere to the support web 26.

In the illustrated embodiment, there is a band 38 of the material of the longitudinal strip 4 which is adjacent the free outer edge 20 and is separated therefrom by the cut 32. The band 38 is adhered to the support web 26 by the second part 36 of the layer of plastic material 28. The band 38 was originally part of the front cover panel 6 and is formed when cut 32 is formed, the cut 32 being made not only through the layer of plastic material 23 but also through front cover panel 6. It has been found that it is easier in practice to cut through both layers of plastic material 28 and the front cover panel 6 thereby to form the free outer edge 20 rather than to cut only through the layer of plastics material 28 and try to align the cut 32 in conformity with the original free outer edge of the front cover panel 6. Thus it is desirable, although not essential, that band 38 is present in the label 2 of the present invention.

Although the illustrated embodiment is rectangular in shape, it will be readily apparent to those skilled in the art that the labels of the present invention may be made any appropriately desired shape.

Figure 4:
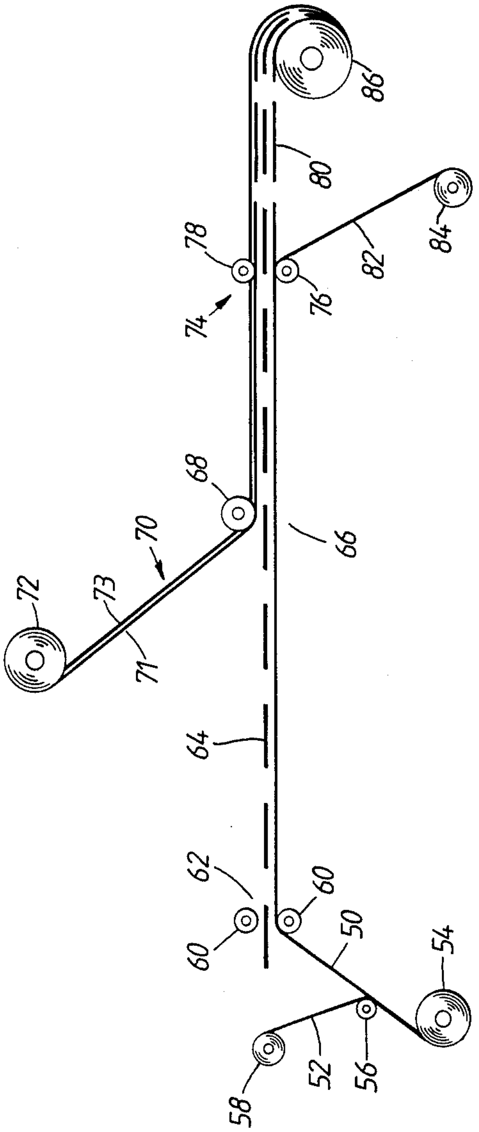
FIG. 4 is a schematic diagram of an apparatus for producing a succession of the labels of FIG. 1 on a length of release backing material in accordance with the method of the present invention.

Referring to FIG. 4, there is shown an apparatus for producing the labels of the present invention so that they are carried in succession on a reel of release backing material.

A web 50 of self-adhesive plastic material, which is preferably a see-through laminate, is carried on a release backing material 52. The combined web 50 and release backing material 52 are fed from a supply reel 54 to a roller 56 at which the release backing material 52 is separated from the web 50 of plastics material and is wound upon a take-up reel 58. The web 50 of plastics material then passes between a pair 60 of nip rollers forming a folded strip applying station 62.

At the folded strip applying station 62, folded longitudinal strips 64 (such as folded longitudinal strip 4 of FIGS. 1 to 3 already provided with holes 22) are fed in succession to the nip rollers 60 by means not shown and the nip rollers 60 apply the succession of strips 64 to the self-adhesive surface of the web 50 of plastic material. The front cover panel (see FIGS. 1 to 3) of each folded longitudinal strip 64 is adhered to the self-adhesive surface of the web 50 of plastic material. The strips 64 are applied in succession so as to be spaced along the length of the web 50.

The web 50 of plastics material with the succession of spaced longitudinal strips 64 thereon then passes to a backing web applying station 66 where a roller 68 pushes a backing web 70 onto the travelling web 50. The backing web 70 is pressure sensitive stock comprising a support web 71 of self-adhesive material (e.g. paper) which has a backing of a release material 73. The backing web 70 is supplied from a supply reel 72 thereof. Roller 68 pushes backing web 70 against the folded strips 64 and the self-adhesive surface of web 50 of plastics material so that the backing web 70 is adhered over the strips 64 and to the web 50 of plastics material by the self-adhesive surface.

The combined web then passes to a die-cutting station 74. The die-cutting station 74 includes a die-cutting roller 76 and a backing roller 78 between which the combined web is passed. The die-cutting roller 76 is mounted on that side of the combined web which is formed by the web 50 of plastics material and backing roller 78 is mounted on the other side of the combined web which is formed by the backing web 70. The die-cutting roller 76 cuts through the web 50 of plastic material, the folded strips 64 and the support web 71 of the self-adhesive material of the backing web 70 as far as, but not through, the release backing material 73 of the backing web 70 so as to form a succession of spaced labels 80 (such as that shown in FIGS. 1 to 3) on the release backing material 73 of the backing web 70. The waste web remnant 82 may be removed and wound up on a take-up roll 84.

The die-cutting roller 76 also makes the cut 32 through the web 50 of plastics material and, if appropriate, front cover panel of the folded longitudinal strip 64. If desired, however, the cut 32 may be made in a separate cutting step at a separate die-cutting station, which is either upstream or downstream of the die-cutting station 74.

In an alternative arrangement, the cut 32 may instead be a weakened tear line, such as a line of perforations.

The release backing material 73 with the succession of labels 80 thereon is then wound up on a reel 86.

Figure 5:
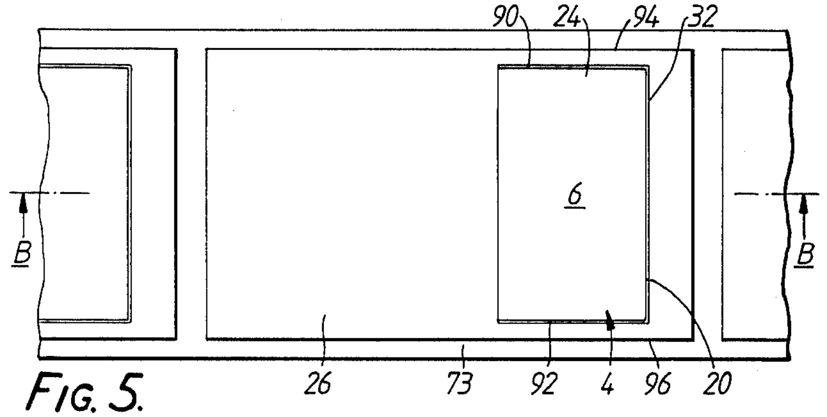
FIG. 5 is a plan view of a succession of a second type of self-adhesive labels carried on a backing of release material which are made in accordance with the method of the present invention.
Figure 6:
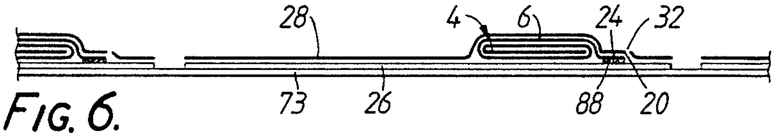
FIG. 6 is a cross-sectional view along line B—B of the succession of labels shown in FIG. 5.

The self-adhesive labels 80 may readily be removed from the release backing material 73 for application to a container to be labelled. FIGS. 5 and 6 show a succession of a further type of self-adhesive label carried on a backing 73 of a release material which may be made in accordance with the method of the present invention by the apparatus of FIG. 4. The labels 2 shown in FIGS. 5 and 6 have a support web 26 to which is adhered a folded longitudinal strip 4 such as that disclosed in British Patent Specification Nos. 2115775 and 2141994. The longitudinal strip 4 is not provided with holes but the overlapping portion 24 of the front cover panel 6 is adhered to the support web 26 by a layer of a resealable adhesive 88 which is disposed therebetween. The layer of resealable adhesive 88 may be already present on longitudinal strip 4 before the longitudinal strip 4 is adhered to the support web 26. In the illustrated arrangement, the ends 90,92 of the folded strip 4 do not extend as far as the top and bottom edges 94,96 of the support web 26. In order for the folded strip to be openable, the cut 32 (or weakened tear line, such as a line of perforations) through the layer of plastic material 28 extends around and substantially in registry with the ends 90,92 as well as the free outer edge 20 of the folded strip 4. The folded strip 4 is opened by separating the layer of plastic material 28 by pulling upwardly the front cover panel 6. When the cut 32 is substituted by a weakened tear line, the layer of plastic material 28 can act so as to hold the front cover panel 6 in a closed position. Tearing along the weakened tear line releases the front cover panel 6 and the strip 4 can be unfolded. After use, the strip 4 can be closed again by re-adhering the overlapping portion 24 to the support web 26 by the layer of resealable adhesive 88. When a weakened tear line is provided, before the label is first opened the weakened tear line can act so as to keep the label closed and optionally the adhesive 88 may be omitted if the label is not required to be resealable. When the ends 90,92 of the strip 4 do coincide with the top and bottom edges 94,96 of the support web 26, it will be readily apparent that the cut 32 (or weakened tear line) only has to extend along the free outer edge 20 of the front cover panel 6.

The labels of FIGS. 5 and 6 may be made by the apparatus of FIG. 4 in a manner similar to that of the label of FIGS. 1 to 3. The front cover panels 6 of the folded longitudinal strip 4 are successively applied to the adhesive surface of the layer of self-adhesive plastics material 28, the backing web 70 is then applied over the strips 4 and the adhesive surface of the layer of plastics material 28, the layer of plastics material 28 and the support web of self-adhesive material are cut by the die-cutting roller 76 so as to cut the succession of labels on the release backing material 73 and the layer of plastic material 28 is cut so as to produce the cut 32 (or weakened tear line), either before, after or simultaneously with the cutting of the succession of labels on the release backing material 73.

Figure 7:
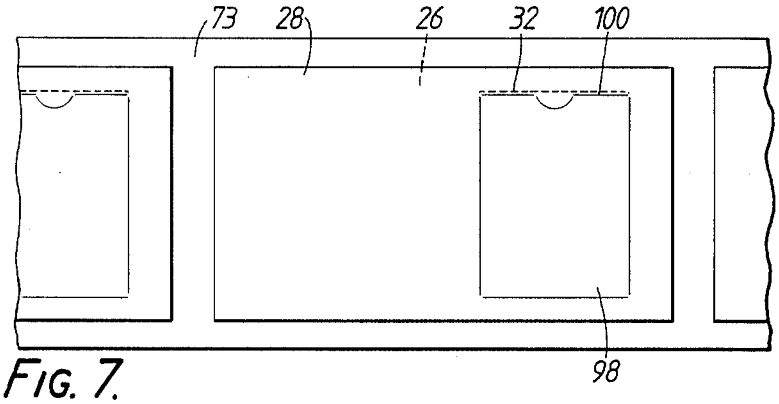
FIG. 7 is a plan view of a succession of a third type of self-adhesive labels carried on a backing of release material made in accordance with the method of the present invention.

FIG. 7 shows a further type of self-adhesive labels carried on a release-backing material 73 which are made by the method of the present invention by the apparatus of FIG. 4.

The labels include an envelope 98 which is open on one edge 100 and is adhered to the support web 26 by the layer of plastic material 28. The envelope 98 may be a folded sheet and envelope such as is disclosed in British Patent Specifications Nos. 1475304 or 2115744. Alternatively, the envelope 98 may be just the envelope portion of that folded sheet and envelope and may contain, instead of an integral folded sheet as is provided by the British Patent Specification, an article such as a booklet. A weakened tear line 32 extends in registry with the open edge 100 of the envelope 98 through the layer of plastic material 28. In order to gain access to the inside of the envelope 98 and remove the contents thereof, the weakened tear line 32 is broken by tearing. The contents may subsequently be re-inserted into the envelope 98 after use.

When the envelope 96 is a folded sheet and envelope as referred to above, the weakened tear line 32 may be replaced by a cut since prior to use the folded sheet cannot fall out of the envelope 98 since it is integral therewith and so there is no need to close the open edge 80 of the envelope 98 with a weakened tear line such as a line of perforations.

Figure 8:
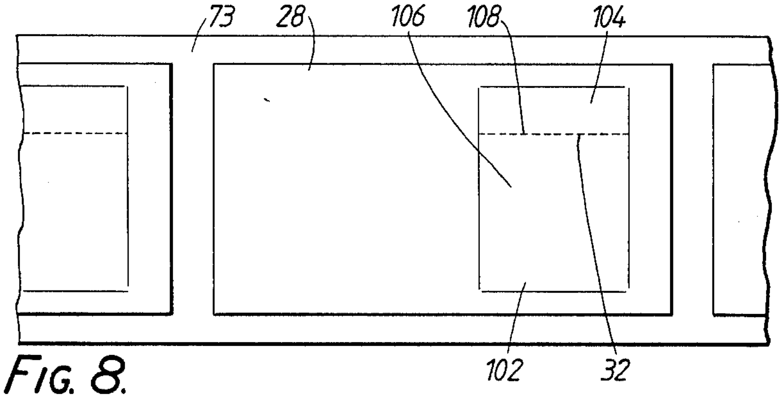
FIG. 8 is a plan view of a succession of a fourth type of self-adhesive labels carried on a backing of release material made in accordance with the method of the present invention.

A still further self-adhesive label which can be made by the method of the present invention using the apparatus of FIG. 4 is shown in FIG. 8.

The label includes an envelope 102 which is similar to that shown in FIG. 7 but is provided with an additional upper panel 104 which is attached to the front panel 106 of the envelope 102 by a line of perforations 108. The layer of plastic material 28 has the weakened tear line 32 formed therein in registry with the line of perforations 108. The envelope 102 can be opened by tearing along the weakened tear line 32 and the line of perforations 108. The front surface of the upper panel 106 may be provided with textual information on how to open the envelope 102.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of producing a succession of self-adhesive labels carried on a backing of release material, comprising the steps of:

(a) applying a succession of folded labels to the adhesive surface of a first web of a pressure-sensitive self-adhesive material;

(b) applying, over the succession of applied folded labels and the adhesive surface, a second web comprising a self-adhesive support web having a backing of release material and being adhered to regions of the adhesive surface of the first web which are not covered by the applied folded labels;

(c) cutting through the layers of the webs other than the backing of release material so as to form a succession of self-adhesive labels on the backing of release material; and (d) cutting, either before, after or simultaneously with step (c), a succession of elongate cuts or weakened tear lines through the first web so that in each resultant self-adhesive label the cut or weakened tear line extends around a portion of the edge of the applied folded label so that separation of the first web along the cut or weakened tear line permits access to the interior of the applied folded label.

2. The method according to claim 1, wherein the folded label is a longitudinal strip divided into two or more panels by one or more transverse fold lines, an end panel of the strip forming a front cover for the remaining panel or panels when the remaining panel or panels is or are folded behind the front cover panel, the front cover panel having a folded edge defined by the fold line between the front cover panel and the panel which is adjacent to the front cover panel and a free outer edge which is opposite the folded edge and extends beyond the remaining panel or panels of the strip when folded, the extending part of the front cover panel having at least one hole, the front cover panel of each folded label being adhered to the first web so that the at least one hole in the front cover panel is covered by the first web of self-adhesive material thereby to form one or more exposed portions of the self-adhesive material, in each resultant label and the cut or weakened tear line is in registry with the free outer edge of the front cover panel so that the front cover panel is secured in a folded condition by the exposed portions of self-adhesive material.

3. The method according to claim 2, wherein the cut or weakened tear line is also cut through the longitudinal strip to form a band of the material of the longitudinal strip which is disposed along the free outer edge of the front cover panel when the front cover panel is folded over the remaining panel or panels, the band being separated from the front cover panel by the cut or weakened tear line and being adhered to the support web by the self-adhesive material.

4. The method according to claim 2 wherein at least one hole is circular and produced by punching.

5. The method according to claim 1, wherein the folded label is a longitudinal strip divided into a series of panels by a plurality of transverse fold lines, the first two of the panels forming a front cover and a back cover respectively for enveloping the remaining panel or panels of the strip when folded, the transverse fold lines being spaced along the strip so that upon folding of the strip the remaining panel or panels is or are folded to lie over the back cover and is or are in turn covered by folding of the front cover about the fold line between the front and back covers and wherein the front cover extends beyond the area occupied by the back cover, the front cover of each folded label being adhered to the first web, a band of adhesive being provided on the inner face of the free outer edge of the front cover panel adjacent to said outer edge for securing the outer edge of the front cover to the support web and in each resultant self-adhesive label the cut or weakened tear line is in registry with the free outer edge of the front rear panel.

6. The method according to claim 5 wherein the outer surface of the front cover carries a lithographically printed image.

7. The method according to claim 1, wherein the folded label is a longitudinal strip divided into two panels by a transverse fold line, the two panels forming a front cover and a back cover respectively for the label when folded and the front surface of the front cover carrying a lithographically printed image, the transverse fold line being spaced along the strip so that upon folding of the strip about the fold line between the front and back covers the front cover lies over the back cover and extends beyond the area occupied by the back cover, the front cover panel having a free outer edge which is opposite the transverse fold line, the front cover of each folded label being adhered to the first web and a band of adhesive being provided on the inner face of the front cover panel adjacent to said free outer edge for securing the free outer edge of the front cover to the support web and in each resultant self-adhesive label the cut or weakened tear line is in registry with the free outer edge of the front cover panel.

8. The method according to claim 1, wherein the folded label is a sheet and an envelope therefor, both formed from a single folded sheet wherein the single sheet is divided into at least two parallel rows of three rectilinear panels each, the two outer panels of a first row being separated from the corresponding two outer panels of the next row by cuts and the middle panels of the first and next rows being joined to one another through a line of perforations aligned with the cuts, the single sheet being folded so that the panels of the first row form the envelope and the sheet is composed of the panels of the next row and of any further rows which are folded to lie adjacent one face of the middle panel of the first row, so that the sheet is enclosed in the envelope but can be removed and detached therefrom by tearing along the line of perforations, the middle panel of the envelope being adhered to the first web and in each resultant self-adhesive label the cut or weakened tear line extends along the unfolded edge of the middle panel of the envelope.

9. The method according to claim 1, wherein the folded sheet and envelope is a sheet and an envelope therefor, both formed from a single folded sheet wherein the single sheet is divided into at least two parallel rows of three rectilinear panels each, the panels of a first row being separated from the corresponding panels of the next row by a line of perforations and each of the two outer panels of the first row of panels having a portion cut away inwardly from the respective outer edge of the sheet adjacent the line of perforations so that the line of perforations stops short of the outer edges of the sheet, the single sheet being folded so that the panels of the first row form the envelope, and the sheet is composed of the panels of the next row and of any further rows which are folded to lie adjacent one face of the corresponding panels of the first row, whereby the sheet is enclosed in the envelope but can be removed and detached therefrom by tearing along the line of perforations, the middle panel of the envelope being adhered to the first web and in each resultant self-adhesive label the cut or weakened tear line extends along the unfolded edge of the middle panel by the envelope.

10. The method according to claim 1, wherein the folded label is an envelope containing an article, the envelope being formed from a single folded sheet, the sheet being divided into a row of three rectilinear panels, the row of three rectilinear panels comprising a middle panel housing a front face and a rear face and two outer panels, a middle panel having at one longitudinal edge thereof a lower panel and at the other longitudinal edge thereof an upper panel which is separated from the middle panel by a line of perforations, the envelope being formed by folding two outer panels of the row and the lower panel over the rear face of the middle panel, a rear face of the envelope comprising the folded two outer panels by the row, the folded lower panel and the middle panel, the envelope being closed either by the disposal of a rear face of the envelope against the support web or by folding the upper panel or a portion thereof over a rear face of the middle panel, so that the envelope so closed can be opened by tearing along the line of perforations so that the article therein can be removed, the middle panel being adhered to the first web and in each resultant self-adhesive label the cut or weakened tear line extends in registry with the line of perforations.

11. The method according to claim 1, wherein the folded label is an envelope containing an article, the envelope being formed from a single folded sheet, the sheet being divided into a row of three rectilinear panels, a middle panel having at one longitudinal edge thereof a lower panel and the envelope being formed by folding two outer panels of the row and the lower panel over the rear face of the middle panel, the front face of the middle panel being adhered to the first web and the cut or weakened tear line extends along the unfolded edge of the middle panel.

12. A method of producing a succession of self-adhesive labels on a length of release backing material, comprising the steps of:

(a) applying a succession of folded labels to the adhesive surface of a first web of a pressure-sensitive self-adhesive material, each folded label comprising a longitudinal strip divided into two or more panels by one or more transverse fold lines, an end panel of the strip forming a front cover panel for the remaining panel or panels when the remaining panel or panels are folded behind the front cover panel, the front cover panel having a folded edge defined by the fold line between the front cover panel and the panel which is adjacent the front cover panel and a free outer edge which is opposite the folded edge and extends beyond the remaining panel or panels of the strip when folded, the extending part of the front cover panel having at least one hole, the front cover panel of each folded label being adhered to the first web so that the at least one hole in the front cover panel is covered by the self-adhesive material thereby to form one or more exposed portions of the self-adhesive material;

(b) applying, over the succession of folded labels and the adhesive surface, a second web comprising a self-adhesive support web having a release backing material, the front surface of the support web being adhered to the regions of the first web which surround the folded labels and to the exposed portions of the self-adhesive material;

(c) cutting through the layers of the webs other than the release backing material so as to form a succession of self-adhesive labels on the release backing material; and (d) cutting, either before, after or simultaneously with step (c), a succession of elongate cuts or weakened tear lines through the first web so that in each resultant label the cut or weakened tear, whereby the front cover panel is secured in a folded condition by the line, is in registry with the free outer edge of the front cover panel exposed portions of the self-adhesive material which are adhered to the support web and the exposed portions of the self-adhesive material can be pulled away from the support web to unfold the front cover panel and provide access to the remaining panel or panels.

13. The method according to claim 12, wherein the cut or weakened tear line is also cut through the longitudinal strip to form a band of the material of the longitudinal strip which is disposed along the free outer edge of the front cover panel when the front cover panel is folded over the remaining panel or panels, the band being separated from the front cover panel by the cut or weakened tear line and being adhered to the support web by the self-adhesive material.

14. The method according to claim 12, wherein the hole or holes are circular holes produced by punching.

* * * * *